United States Patent
Schall et al.

(10) Patent No.: US 9,371,474 B2
(45) Date of Patent: Jun. 21, 2016

(54) (METH)ACRYLATE-FUNCTIONAL POLYACRYLATE RESINS WITH NARROW BUT BIMODAL MOLECULAR WEIGHT DISTRIBUTIONS

(71) Applicant: HENKEL US IP LLC, Rocky Hill, CT (US)

(72) Inventors: Joel D. Schall, Hamden, CT (US); John G. Woods, Farmington, CT (US); Anthony F. Jacobine, Meriden, CT (US); Alfred A. DeCato, Waterbury, CT (US); Eric Hernandez Edo, Barcelona (ES)

(73) Assignee: Henkel IP & Holding GmbH, Duesseldorf (DE)

( * ) Notice: Subject to any disclaimer, the term of this patent is extended or adjusted under 35 U.S.C. 154(b) by 152 days.

(21) Appl. No.: 14/219,691

(22) Filed: Mar. 19, 2014

(65) Prior Publication Data
US 2014/0283983 A1     Sep. 25, 2014

Related U.S. Application Data

(63) Continuation of application No. PCT/US2012/055367, filed on Sep. 14, 2012.

(60) Provisional application No. 61/536,415, filed on Sep. 19, 2011.

(51) Int. Cl.
  *C09J 133/08*  (2006.01)
  *C08F 220/18*  (2006.01)
  *B29C 65/70*  (2006.01)

(52) U.S. Cl.
  CPC .............. *C09J 133/08* (2013.01); *B29C 65/70* (2013.01); *C08F 220/18* (2013.01); *C08F 2438/01* (2013.01)

(58) Field of Classification Search
  CPC ..... B29C 65/70; C08F 220/18; C08F 220/54; C08F 2438/01; C08F 2220/1825; C08F 2220/1808; C08F 2220/281; C09J 133/08; C08L 33/08
  See application file for complete search history.

(56) References Cited

U.S. PATENT DOCUMENTS

| | | | |
|---|---|---|---|
| 4,258,123 A | 3/1981 | Nagashima et al. | |
| 4,505,793 A | 3/1985 | Tamoto et al. | |
| 6,274,688 B1 | 8/2001 | Nakagawa et al. | |
| 6,784,256 B1 | 8/2004 | Lee et al. | |
| 7,790,094 B2 * | 9/2010 | Lim et al. ...................... | 264/478 |
| 2002/0137841 A1 | 9/2002 | Nakagawa et al. | |
| 2011/0068512 A1 | 3/2011 | Decato et al. | |
| 2011/0213091 A1 | 9/2011 | Balk et al. | |

FOREIGN PATENT DOCUMENTS

| | | |
|---|---|---|
| CN | 102165009 A | 8/2011 |
| EP | 1724322 A1 | 11/2006 |
| WO | 2009155303 A3 | 12/2009 |

OTHER PUBLICATIONS

Percec, V. et al. "Ultrafast Syntheses of Ultrahigh Molar Mass Polymers by Metal-Catalyzed Living Radical Polymerization of Acrylates, Methacrylates, and Vinyl Chloride Mediated by SET at 25 degrees C", A.J.AM. Chem. Soc. 2006, 128, 14156-14165.

* cited by examiner

*Primary Examiner* — Nathan M Nutter
(74) *Attorney, Agent, or Firm* — Steven C. Bauman (57) ABSTRACT

The present invention is directed to compositions useful for maintaining sealing force over time while under compression in compressive gaskets. Additionally, methods of preparing and using the sealing compositions and improving sealing performance using such compositions are provided.

20 Claims, 8 Drawing Sheets

(METH)ACRYLATE-FUNCTIONAL POLYACRYLATE RESINS WITH NARROW BUT BIMODAL MOLECULAR WEIGHT DISTRIBUTIONS

FIELD OF THE INVENTION

The present invention provides compositions useful for maintaining sealing or adhesion force over time while under compression. Additionally, methods of preparing and using the sealing or adhesive compositions and improving sealing or adhesive performance using such compositions are provided. Desirably, engine components, such as valve cover gaskets, coated with such compositions are provided.

BACKGROUND OF THE INVENTION

Compressive gaskets need to maintain sealing force over time while under compression. For example, in automobiles, materials are needed that provide low compression set while maintaining a high elongation and high sealing force at service temperatures that may be less than 0° C. A poor quality seal in engine valve cover gaskets leads to increased emissions and reduced engine efficiency, neither of which is desirable.

A number of sealants are disclosed in the art. U.S. Pat. No. 6,274,688 describes a vinyl polymer which has at least one terminal functional group per molecule and has a ratio of weight average molecular weight to number average molecular weight of less than 1.8.

There is a need for compositions which improve sealing or adhesive performance of substrates contacted therewith, particularly engine valve cover gaskets.

There is a need in the art for materials that provide low compression set while maintaining high elongation and high sealing force at service temperatures that may be lower than 0° C.

SUMMARY OF INVENTION

The present invention is directed to compositions useful for maintaining sealing or adhesion force over time while under compression including a blend of at least two (meth)acrylic telechelic components having different molecular weights. The combination of at least two (meth)acrylic telechelic components in a blend provides improved sealing and adhesion properties, including enhanced compression strength, tensile strength and enhanced elongation.

In one embodiment, the blend comprise a first (meth)acryl telechelic polymer component having a first molecular weight of less than 15,000, and a second (meth)acrylic-containing telechelic polymer component having a second molecular weight that is greater than 20,000.

In another aspect, the blend has an average molecular weight from about 14,000 to about 40,000, where "average molecular weight of the blend (AMWB)" is defined by the equation:

AMWB=(MW of polymer 1)*(wt % polymer 1 in the blend)+(MW of polymer 2)*(wt % polymer 2)+ . . . +(MW of polymer $n$)*(wt % polymer $n$)

In another aspect, there is provided an article of manufacture comprising the reaction product of: a) a first (meth) acrylic-containing telechelic polymer component having a first molecular weight; b) a second (meth)acrylic-containing telechelic polymer component having a second molecular weight that is different from said first molecular weight.

In another aspect, there is provided a method of forming a gasket comprising: mixing a) a first (meth)acrylic-containing telechelic polymer component having a first molecular weight; b) a second (meth)acrylic-containing telechelic polymer component having a second molecular weight that is different from said first molecular weight to a substrate; curing the mixture using an appropriate cure agent or cure system as disclosed herein.

In another aspect, the present invention provides a gasket comprising the sealant and adhesion compositions of the present invention.

In another aspect, the present invention provides a process for applying a seal to an article comprising the steps of forming blend comprising: i) a first (meth)acrylic-containing telechelic polymer component having a first molecular weight; a second (meth)acrylic-containing telechelic polymer component having a second molecular weight that is different from said first molecular weight; wherein said blend has an average molecular weight from about 14,000 to about 40,000; and optionally at least co-reactive component; depositing said blend on said article in the shape and thickness desired to form an uncured seal; and curing said uncured seal with a cure system appropriate to and for a time sufficient to form a cured seal.

In another aspect, the present invention provides a process for applying a seal to an article comprising the steps of forming blend comprising: a first (meth)acrylic-containing telechelic polymer component having a first molecular weight; a second (meth)acrylic-containing telechelic polymer component having a second molecular weight that is different from said first molecular weight; wherein said blend has an average molecular weight from about 14,000 to about 40,000, and each polymeric component in the blend has a polydispersity of about 1.01 to about 2.50 and desirably 1.01 to about 1.50; and optionally at least one co-reactive component; depositing said mixture on said article in the shape and thickness desired to form an uncured seal; and joining said uncured seal to another article and curing said uncured seal with a curing system appropriate to and for a sufficient time to form a seal.

DETAILED DESCRIPTION

The present invention is directed to sealant or adhesive composition comprising a blend of (meth)acrylic-containing components, which provide improved compression, sealant and adhesive properties, such as, for use in automobile gaskets in mechanical and industrial parts in general.

The terms "(meth)acrylate" or "(meth)acryloxy" will include methacrylate and acrylate and methacryloxy and acryloxy, respectively. A "blend of (meth)acrylic-containing components" or a "blend" refers to a blend of at least two "(meth)acrylic telechelic polymers" having different molecular weights. The (meth)acrylic telechelic polymer as used herein refers to at least two polymers of the blend may be the same polymer material having different molecular weights or a different polymer material having different molecule weights. The blend may comprise from 2 to 10 (meth)acrylic-containing telechelic polymers, including at least 3, at least 4, at least 5, at least 6, at least 7, at least 8, at least 9 (meth) acrylic-containing telechelic polymers, and up to 10 (meth) acrylic-containing telechelic polymers. In other embodiment, blend contains 2 to 4 (meth)acrylic-containing telechelic polymers.

As used herein, a "telechelic polymer" is a di-end-functional polymer where both ends possess the same functionality.

The compositions of the present invention may be useful, for example, for cure-in-place applications. They may be used for applying a seal to an article, such as, for example, a gasket. More specifically, the uncured compositions may be directly applied to an article or surface to be sealed and exposed to UV or visible radiation to cure the composition and form a seal.

The term "cure" or "curing," as used herein, refers to a change in state, condition, and/or structure in a material that is usually, but not necessarily, induced by at least one variable, such as time, temperature, moisture, radiation, presence and quantity in such material of a curing catalyst or accelerator, or the like. The terms cover partial as well as complete curing. For purposes of the present invention, the terms mean at least partially crosslinked, and in more desirable embodiments substantially or fully crosslinked.

Exemplary (meth)acrylic telechelic polymers include polymers derived from a wide variety of monomers represented by $H_2C=CGCO_2R$, where G may be hydrogen, halogen, nitrile, or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like. Specific (meth)acrylates include polyethylene glycol di(meth)acrylates, desirably triethyleneglycol di(meth)acrylate, hydroxypropyl (meth)acrylate, bisphenol-A di(meth) acrylates, such as ethoxylated bisphenol-A (meth)acrylate ("EBIPA" OR "EBIPMA"), and tetrahydrofuran (meth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA"). Telechelic polymers may also be made from copolymers of the above monomers. Exemplary (meth)acrylates include a wide variety of materials represented by $H_2C=CGCO_2R$, where G may be hydrogen, halogen, nitrile or alkyl of 1 to about 4 carbon atoms, and R may be selected from alkyl, cycloalkyl, alkenyl, cycloalkenyl, alkaryl, aralkyl or aryl groups of 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

Specific (meth)acrylates include polyethylene glycol di(meth)acrylates, desirably triethyleneglycol di(meth)acrylate, hydroxypropyl (meth)acrylate, bisphenol-A di(meth) acrylates, such as ethoxylated bisphenol-A (meth)acrylate ("EBIPA" OR "EBIPMA"), and tetrahydrofuran (meth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl (meth)acrylate, ethoxylated trimethylol propane triacrylate ("ETTA"), triethylene glycol diacrylate and triethylene glycol dimethacrylate ("TRIEGMA").

In some embodiments of the present invention, the (meth) acrylic-containing telechelic polymer component may be an alkyl (meth)acrylate polymer. More specifically, the alkyl (meth)acrylate polymer may be a homopolymer of $C_1$-$C_{10}$ (meth)acrylates or a copolymer of $C_1$-$C_{10}$ (meth)acrylates. Suitable alkyl acrylates include, but are not limited to, ethyl acrylate, butyl acrylate, and methoxyethyl acrylate.

Co-Reactive Components

Suitable additional monomers for incorporating into the blend compositions of the present invention (once the blends are prepared) include, without limitation, acrylates, halogenated acrylates, methacrylates, halogen-substituted alkenes, acrylamides, methacrylamides, vinyl sulfones, vinyl ketones, vinyl sulfoxides, vinyl aldehydes, vinyl nitriles, styrenes, and any other monomers. These monomers may be substituted. Combinations of the monomers may be used. Blends of monomers may be polymerized using the embodiments of the present invention. The monomers may be blended in the reaction vessel. As an example, blends of acrylate monomers may be used with the methods of the present invention, as certain acrylates will exhibit similar reactivities, thus the end product may have a greater predictability. Blends of the final polymer product, as a two co-polymer blend, a two homopolymer blend, and a combination of at least one co-polymer and at least one homopolymer may be blended as may be desired. Further, blended polymers can be made as final products. Blended polymer products may be preferred to others because a blended copolymer may provide and promote good oil resistance in gasket applications. Specifically, the additional monomer may be one or more of, for example, alkyl (meth)acrylates; alkoxyalkyl (meth)acrylates; (meth) acrylonitrile; vinylidine chloride; styrenic monomers; alkyl and alkoxyalkyl fumarates and maleates and their half-esters, cinnamates; and acrylamides; N-alkyl and aryl maleimides (meth)acrylic acids; fumaric acids, maleic acid; cinnamic acid; and combinations thereof. More specifically, the monomers used to create polymers with the embodiments of the present invention are not limited to any particular species but includes various monomers, for example: (meth)acrylic acid monomers such as (meth)acrylic acid, methyl(meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth) acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, alpha-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl compounds such as vinyl halides, such as vinyl chloride, vinylidenehalide, allylhalide, allyl alcohol, etc. The aforementioned monomers may be used singly, sequentially, or in combination. From the desirability of physical properties of products, one or more classes of monomer may be preferred.

Cure Systems

The inventive blends of the present invention may be formulated with a variety of cure systems, including but not limited to free-radical curing, moisture-curing, heat-curing and curing via redox reactions. Among free-radical curing systems are included room temperature and heat curing mechanisms, as well as photocuring mechanisms. Among the redox reactions useful for curing include anaerobic curing systems. Heat curing via hydrosilylation groups is also contemplated. The choice of cure system is largely dictated by the type of functional groups present and the specific application or end use of the composition.

Multiple cure systems may be employed, if desired. For example, photocuring and moisture curing compositions may be prepared from the inventive blends.

The compositions of the present invention also may include a curing initiator (or, photoinitiator), such as a UV initiator, a visible initiator or a combination of UV and visible initiators.

A variety of UV initiators may be employed. UV initiators are generally effective in the 200 to 400 nm range, and particularly in the portion of the spectrum that borders on the invisible light and the visible portion just beyond this, e.g. >200 nm to about 390 nm.

Initiators that will respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanolamine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof.

Examples of such UV initiators include initiators available commercially from Ciba Specialty Chemicals Inc. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Of course, combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Initiators suitable for use in the present invention that will respond to visible light to initiate and induce curing include, but are not limited to, camphoroquinone peroxyester initiators, 9-fluorene carboxylic acid peroxyesters, visible light [blue] photoinitiators, dl-camphorquinone, "IRGACURE" 784DC (photoinitiator based on substituted titanocenes), and combinations thereof.

Other suitable photoinitiator systems include those disclosed in each of the following patents or publications, each of which is incorporated by reference herein in its entirety. U.S. Pat. No. 4,505,793 to Tamoto et al., which is incorporated by reference herein, discloses photopolymerization initiators that include a combination of a 3-keto-substituted cumarin compound and an active halogeno compound. A number of exemplary compounds are disclosed. Such photopolymerization initiators cure by exposure to light having wavelengths ranging between about 180 nm and 600 nm. U.S. Pat. No. 4,258,123 to Nagashima et al., which is incorporated by reference herein, discloses photosensitive resin compositions including initiator components that generate a free radical upon irradiation with actinic light. Such components include various triazine compounds, as more fully described therein.

Heat curable compositions are among the various embodiments of the invention. Useful heat curing catalysts include, without limitation, hydrosilylation catalysts such as platinum, rhodium and their respective organohydrocarbon complexes. These heat curing catalysts may be present in amounts of about 0.01% to about 10% by weight of the total composition, and more desirably in amounts of about 0.1% to about 5% by weight of the total composition.

Moisture curing catalysts useful in compositions of the present invention include, without limitation, organometallic complexes, such as organotitinates (e.g. tetraisopropylorthotitanate, tetrabutoxyorthotitanate), metal carboxylates such as dibutyltin delaurate and dibutyltin dioctoate and combinations thereof. Moisture cure catalysts may be present in any amounts effective to achieve the intended cure. Desirable, they are incorporated in amounts of about 0.1% to about 5% by weight of the total composition.

Free radical initiators useful in formulating polymerizable compositions of the present invention include without limitation peroxy and perester compounds such as benzoyl peroxide, 2,4-dichlorobenzoyl peroxide, t-butyl perbenzoate, cumene hydroperoxide (CHP), di-t-butyl peroxide and dicumyl peroxide, 2,5-bis(t-butylperoxy) 2,5-dimethylhexane. Free radical initiators may be incorporated in any amounts useful to achieve the desired reaction or cure. Desirably, they are present in amounts of about 0.01% to about 10% by weight of the total composition. Combinations of the free-radical initiators are also useful.

Useful inhibitors to enhance shelf life and prevent premature reactions may be added to various embodiments where appropriate, as well as various chelators. For example, various quinones may be employed, such as hydroquinones, benzoquinones, napthoquinones, phenanthraquinones, anthraquinones and substitutions thereof may be employed, as well as various phenols, such as 2,6-di-tert-butyl-4-methylphenol. Chelating agents such as ethylene diamine tetracetic acid (EDTA) may be employed. The inclusion and specific selection and amounts used will depend on the embodiment chosen.

Heat curing catalysts include peroxides, as described herein and Azo compounds such as: 1,1'-Azobis(cyclohexanecarbonitrile) (ACHN); 2,2'-Azobis(2-methylpropionamidine) dihydrochloride (AAPH); 2,2'-Azobis(2-methylpropionitrile) (AIBN); 4,4'-Azobis(4-cyanovaleric acid) (ACVA). Heat curing catalysts may be used in amounts of about 0.1% to about 10% by weight of the total composition.

In formulations designed to cure anaerobically, appropriate anaerobic initiators, accelerator components and inhibitor or chelating components may be employed as described herein.

Catalysts and accelerators for anaerobically curable compositions made from the inventive compositions include any of the known catalysts and accelerators. For example sulfones such as bis(phenylsulfonemethyl)amine, N-methyl-bis-(phenylsulfonemethyl)amine, bis(p-tolylsulfonemethyl)amine, N-methyl-bis(p-tolylsulfonemethyl)amine, N-ethyl-bis(p-tolylsulfonemethyl)amine, N-ethanol-bis(p-tolylsulfonemethyl)amine, N-phenyl-ptolylsulfonemethyl-amine, N-phenyl-N-methyl-p-tolylsulfonemethyl-amine, N-phenyl-N-ethyl-p-tolylsulfonemethyl-amine, N-p-tolyl-N-methyl-p-tolylsulfonemethyl-amine, bis-(p-tolylsulfonemethyl)ethylenediamine, tetrakis-(p-tolylsulfonemethyl)ethylenediamine, bis-(p-tolylsulfonemethyl)hydrazine, N-(p-cholorphenyl)-p-tolylsulfonemethyl-amine, and N-(p-carboethoxyphenyl)-(p-tolylsulfonemethyl)amine may be employed. For most applications, the catalyst is used in amounts of from about 0.05 to 10.0% by weight, preferably from about 0.1 to 2% of the total composition.

The catalysts for anaerobic compositions of the present invention may be used alone in the anaerobic system or an accelerator such as orthosulfobenzimide (saccharin) may be employed in amounts of about 0.05 to 5.0% by weight of the monomer.

In anaerobic compositions, it may also be desirable to employ antioxidants, thermal stabilizers or free radical inhibitors such as tertiary amines, hydroquinones, etc. in order to further prolong the shelf-life of the composition. In particular, it may be preferred to add a sterically hindered phenol, e.g. butylated hydroxytoluene (BHT), butylated hydroxyanisole (BHA), or such stabilizers as are commercially available under the tradenames Ionox 220 (Shell), Santonox R (Monsanto), Irganox 1010 and Irganox 1076 (Ciba-Geigy), etc.

Although the anaerobic compositions of the invention will cure satisfactorily under any set of anaerobic conditions, the presence of selected metals on the surface of the components to be bonded will appreciably increase the rate of curing. Suitable metals which are effective with these anaerobic compositions include iron, copper, tin, aluminum, silver and alloys thereof. The surfaces provided by the metals, alloys and their platings and which are useful in accelerating curing of these compositions will, for convenience, be grouped into the term "active metal" surfaces and be understood to include but not be limited to all of the metallic entities mentioned above. It is to be further noted that in bonding components which do not comprise these active metals (e.g. plastic, glass, non-active metal surfaces) it may be desirable to accelerate curing by pretreating these surfaces with an active metal compound which is soluble in the monomer-catalyst mixture such as ferric chloride, and cobalt, manganese, lead, copper and iron "soaps" such as cobalt-2-ethyl hexoate, cobalt butyrate, cobalt naphthenate, cobalt laurate, manganese-2-ethyl hexoate, manganese butyrate, manganese naphthenate, manganese laurate, lead-2-ethyl hexoate, lead butyrate, lead naphthenate, lead laurate, etc. and mixtures thereof. These active metal compounds may be readily applied to the surfaces, for example, by wetting the surfaces with a dilute solution of the metal compound in a volatile solvent such as trichloroethylene and then permitting the solvent to evaporate. Non-active surfaces treated in this manner can be bonded together with the sealants of the present invention as quickly as active metal surfaces.

The initiators set forth above are for the purposes of illustration only and are in no way meant to limit the initiators that may be used in the present invention.

Initiators may be employed in amounts of about 0.1% to about 10% by weight of the total composition. More desirably, the initiator is present in amounts of 0.5% to about 5% by weight of the total composition.

The compositions of the present invention may include one or more components selected from the group consisting of reactive diluents, non-reactive diluents, fillers, plasticizers, stabilizers, antioxidants, curing agents, cross-linking agents, catalysts, pigments, elastomers, and combinations thereof.

Optional additives, such as, but not limited to, stabilizers, inhibitors, oxygen scavenging agents, fillers, dyes, colors, pigments, adhesion promoters, toughening agents, reinforcing agents, fluorescing agents, rheological control agents, wetting agents, antioxidants and combinations thereof also may be included in the compositions of the present invention.

In one particularly useful aspect of the invention, the backbone of both polymers in the blend is a polymer formed from various monofunctional (meth)acrylate monomers, such as homopolymers of monofunctional $C_{1-10}$ alkyl(meth)acrylates and copolymers of monofunctional $C_{1-10}$ alkyl(meth) acrylates. Among the particularly useful monomers used include ethyl acrylate, methoxyethyl acrylate, n-butyl acrylate and homopolymers and copolymers thereof. As additional examples of useful monomers, there are included (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate), phenyl (meth)acrylate, tolyl (meth) acrylate, benzyl (meth)acrylate, 2-methoxyethyl (meth)acrylate, 3-methoxybutyl (meth)acrylate, 2-hydroxyethyl (meth) acrylate, 2-hydroxypropyl (meth)acrylate, stearyl (meth) acrylate, glydicyl (meth)acrylate, 2-aminoethyl (meth) acrylate, γ-(methacryloxoxypropyl) trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, etc.; styrenic monomers such as styrene, vinlytoluene, α-methylstyrene, chlorostyrene, styrenesulfonic acid and its salt; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecyclmaleimide, stearylmaleimide phenylmaleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride and allyl alcohol. These monomers may be used each alone or a plurality of them may be copolymerized. Among these, from the standpoint of physical properties of the product, styrenic monomers and (meth)acrylic monomers are preferred. Desirable are acrylic ester monomers and methacrylic ester monomers. In the present invention, those preferred monomers may be copolymerized with other monomers but, in such cases, said preferred monomers may account for 40 weight % of the total composition.

Additionally, the backbone of the inventive reactive blends may be formed from or include one or segments or units of polyurethane, styrene, polyolefins, acrylamide, nylon and/or (meth)acrylonitriles and substituted (meth)acrylonitriles.

In an embodiment, the (meth)acrylic-containing telechelic polymer has a backbone selected from a butyl acrylate-co-ethyl acrylate, butyl acrylate-co-ethyl acrylate-co-methoxyethyl acrylate and combinations therein. In an embodiment, the (meth)acrylic-containing telechelic polymer is 75% butyl acrylate/20% ethyl acrylate/5% methoxyethyl acrylate terpolymer, end-capped with methacrylate. In an embodiment, the blend comprises a first (meth)acrylic-containing telechelic polymer of a 30,000 molecular weight terpolymer of 75% butyl acrylate/20% ethyl acrylate/5% methoxyethyl acrylate, end-capped with methacrylate and a second (meth)acrylic-containing telechelic polymer of a 10,000 molecular weight terpolymer of 75% butyl acrylate/20% ethyl acrylate/5% methoxyethyl acrylate, end-capped with methacrylate.

The number average molecular weight of the polymer may be 500 to 100,000, more desirably 10,000 to 50,000. The blends comprise a low molecular weight (meth)acrylic-containing telechelic polymer and a high molecular weight (meth)acrylic-containing telechelic polymer. In an embodiment, a low molecular weight (meth)acrylic-containing telechelic polymer has a molecular weight of less than 15000, and a high molecular weight (meth)acrylic-containing telechelic polymer has a molecular weight of greater than 15000.

In an embodiment, the blend may have an average molecular weight (AMWB) from at least about 14,000 to at least about 40,000.

Preparation

The polymers for use in the blends can be prepared using standard techniques known in the art, or obtained from suitable commercial sources. The polymers can be prepared, e.g., using controlled radical polymerization processes, including Single Electron Transfer Living Radical Polymerization (SET-LRP), by stable free radical polymerization (SFRP) such as reversible deactivation by coupling, or by degenerative transfer (DT). The polymers may be end-capped using processes known in the art, such as, using a methacrylate functional group.

The polymers of the present invention, may be used in controlled radical polymerization reactions to create polymers with such properties as with increased conversion, low polydispersity, high functionality of the end products and monomodal distribution of molecular weight. Since the polymers are preferably functionalized, they will provide sites for further reaction with additional components, for further modification of the structure, for curing or a combination thereof.

SET, SFRP and DT are useful methods to build polymers of the present invention. The controlled or living polymerization process is one in which chain transfer and termination reactions are essentially nonexistent. These developments allow for the production of polymers that possess specific and precise quantitative functionality and chemical reactivity, with a high degree of efficiency and optimization.

Figure 1:
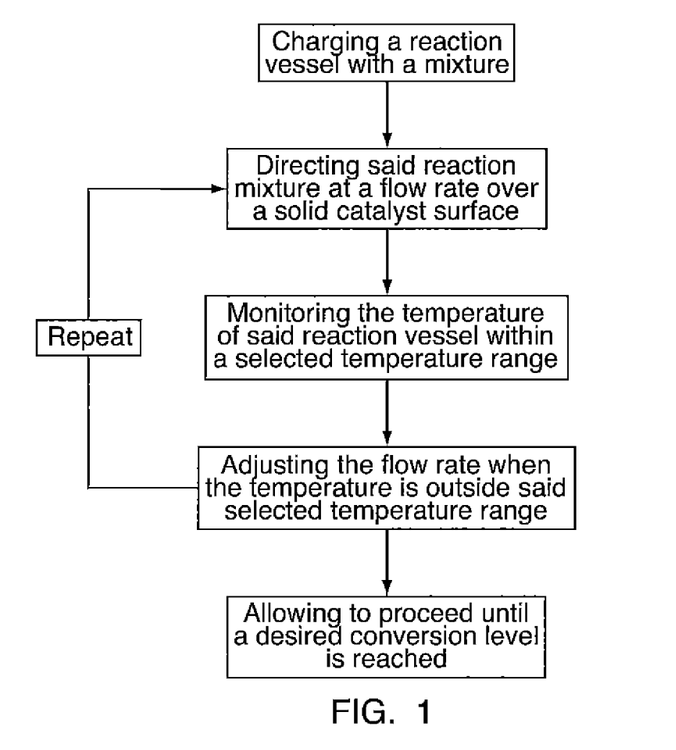
FIG. 1 shows a flowchart outlining a useful controlled free-radical polymerization process.
Figure 2:
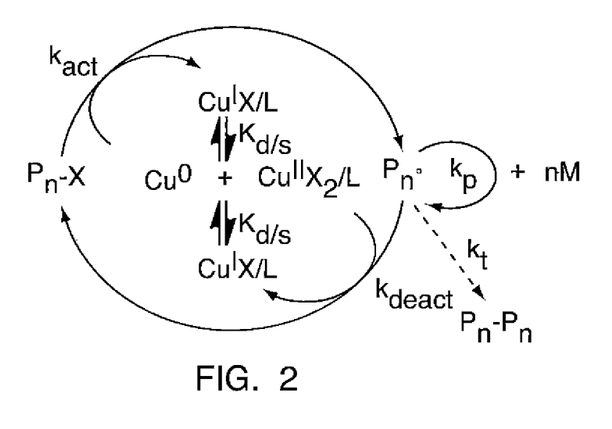
FIG. 2 depicts a proposed SET mechanism useful in the present invention.

Metal-catalyzed organic radical reactions and controlled radical polymerization (LRP), may be performed in polar solvent systems, including mixtures of non-polar and polar systems. The mechanism may include reversible deactivation of the radicals by Cu(II) $X_2$ which is formed by disproportionation of Cu(I)X (See FIG. 2), via an outer-sphere SET process. This process has a very low activation energy and thus involves fast activation and deactivation steps and negligible bimolecular termination at room temperature. For a more detailed discussion, see Percec, V. et al; "*Ultrafast Syntheses of Ultrahigh Molar Mass Polymers by Metal-Catalyzed Living Radical Polymerization of Acrylates, Methacrylates, and Vinyl Chloride Mediated by SET at 25°*", A. J. AM. Chem. Soc. 2006, 128, 14156-14165, which is incorporated herein by reference in its entirety.

One particularly useful method of controlled radical polymerization is described in US Application No. PCT/US2009/047479, published as WO2009/155303A3, and assigned to Henkel Corporation, which is incorporated by reference herein in its entirety. This application provides a method of directing the reaction mixture at a predetermined flow rate over a solid catalyst surface which is contained outside of the reaction vessel, and monitoring the temperature of the reaction vessel within a certain temperature range, adjusting the flow rate when the temperature range is outside the selected temperature range, and allowing the polymerization to proceed until a desired level of conversion is reached. This method is particularly useful in producing the polymer compositions described herein.

SET-LRP may be performed at low activation energies and thus at lower temperatures. The catalyst used regenerates itself, thus the polymerization process is living. Increasing solvent concentration of the reaction mixtures gives faster polymerization. The SET-LRP reaction starts with a SET reaction between a Cu (O) species and a halogen-containing substrate (initiator or halogen-terminated polymeric chain end). The polymerization proceeds by an outer-sphere SET mechanism in which Cu (O) species acts as electron donors, and the dominant initiator and propagating species R—X (x is a halide anion) acts as electron acceptors.

There has been a continuing effort to make the controlled radical polymerization as environmentally benign and as low cost a process for the preparation of functional materials as possible. Factors such as control over the polymer molecular weight, molecular weight distribution, composition, architecture, and functionality are important considerations in the design and execution of such methods. The methods of the present invention allow for greater control over the final polymer products such that the desired chain length, polydispersity, molecular weight, and functionality are easily incorporated into the final product. Thus, the present invention overcomes the poor control over molecular weight distribution, low functionality, poor control of polymer rheology, and undesirable polydispersity. Also, because this process is so predicable, it can be easily implemented on a large scale with a high predictability and/or used to tailor the properties of the final polymer products to new degrees, and products can be designed based on their properties. Further, because there is less termination, the structure and composition of the polymer are more precise and the end product has more desirable properties and characteristics to promote a better product. Further, as very low levels of catalyst are needed to drive the reaction, purification of the final product is facilitated, and at times, unnecessary. Further, the components of the system may be optimized to provide even more precise control over the (co)polymerization of monomers.

The catalyst employed in the controlled or living polymerization processes used herein may contribute to determining the position of the atom transfer equilibrium and dynamics of exchange between dormant and active species. Thus, the catalyst employed should preferably be a good electron donor. The catalyst may be, for example: Cu(O); $Cu_2S$; $Cu_2Te$; $Cu_2Se$; Mn; Ni; Pt; Fe; Ru; V; CuCl; $CuCl_2$; CuBr; $CuBr_2$; and combinations thereof, and the like, as is known in the art. Similarly, other catalysts, including, for example, Au, Ag, Hg, Rh, Co, Ir, Os, Re, Mn, Cr, Mo, W, Nb, Ta, Zn, and compounds including one or more thereof may be employed with the present methods. One particularly effective catalyst is elemental copper metal, and its derivatives.

Copper complexes are especially desirable. Monovalent copper compounds include such species as cuprous chloride, cuprous bromide, cuprous iodide, cuprous cyanide, cuprous oxide and cuprous perchlorate. When a copper catalyst is used, there is added such a ligand as 2,2'-bipyridyl or a derivative thereof, 1,10-phenanthrophosphorus or a derivative thereof, or a polyamine such as tetramethylethylenediamine, pentamethyldiethylene-triamine, hexamethyltris(2-aminoethyl)amine or the like for improved catalyst activity. The tris (triphenylphosphine) complex of ruthenium (II) chloride ($RuCl_2(PPh_3)_3$) is also a usual catalyst. When a ruthenium compound is used as the catalyst, an aluminum alkoxide is added as the activator. In addition, bis(triphenylphosphine) iron (II) chloride complex ($FeCl_2(PPh_3)_2$), bis(triphenylphosphine) nickel (II) complex ($NiCl_2(Pph_3)_2$) and bis(tributylphosphine) nickel (II) complex ($NiBr_2(PBU_3)_2$) are also suitable catalysts.

The catalyst may take one or more forms. For example, the catalyst may be in the form of a wire, mesh, screen, shavings, powder, tubing, pellet, crystals, or other solid form. The catalyst surface may be one or more of a metal, as previously disclosed or metal alloy. More particularly, the catalyst may be in the form of a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof.

The controlled polymerization methods used herein may also include the presence of a ligand, for example, a nitrogen-containing ligand which may aid in the extraction of the catalyst to the extent that the metal catalyst may be solubilized by the ligand so it is available in its higher oxidation state. Thus, the ligand may be desirable to drive the polymerization reaction to the effect that it may aid in promoting a mixture of the various components of the reaction mixture on a molecular level. A wide variety of nitrogen-containing ligands are suitable for use in the present invention. These compounds include primary, secondary, and tertiary alkyl or aromatic amines, preferably tertiary amines, as well as polyamines which may be linear, branched, or dendritic polyamines and polyamides. Suitable ligands for use in the present invention include ligands having one or more nitrogen, oxygen, phosphorus and/or sulfur atoms which can coordinate to the transition metal through a sigma-bond, and ligands containing multiple carbon-carbon bonds which can coordinate to the transition metal through a pi-bond. For example, suitable ligands may include tris(2-dimethylaminoethyl)amine (Me6-TREN), tris(2-aminoethyl)amine (TREN), 2,2-bipyridine (bpy), N,N,N,N,N-pentamethyldiethylenetriamine (PMDETA), and many other N-ligands.

The ligand may preferentially form a soluble complex with the redox conjugate of the transition metal, i.e. the higher oxidation state of the transition metal, forming a complex that is active in the deactivation of the growing radical chain, which may contribute to a narrow molecular weight distribution of the polymer product.

Initiators of controlled radical polymerization of the present method may initiate the free radical reaction and thusly, may be considered as contributors to the number of growing polymer chains in the reaction vessel. Suitable initiators include, for example, halogen containing compounds. Examples of initiators include chloroform, bromoform, iodoform, carbon tetrachloride, carbon tetrabromide, hexahalogenated ethane, mono-di, and tri haloacetates, acetophenones, halogenated amides, and polyamides such as nylons, halogenated urethanes and polyurethane including their block copolymers halogenated imides, acetone, and any other initiators shown to work with conventional metal catalyzed living radical polymerization including ATRP and SET-LRP. A wide variety of initiators are suitable for use in the present invention. Halogenated compounds are particularly suited for use in the invention. These initiators include compounds of the formula R—X of "R'C(=O)OR" where X is a halogen and R is C1-C6 alkyl. For example, the initiator may include: diethyl meso-2,5-dibromoadipate; dimethyl 2,6-dibromo-heptanedioate, ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; alpha,alpha'-dibromo-ortho-xylene; alpha,alpha"-dibromo-meta-xylene; alpha,alpha"-dibromo-para-xylene; ☐ alpha, alpha"-dichloro-para-xylene; 2-bromopropionic acid; methyl trichloroacetate; para-toluenesulfonyl chloride; biphenyl-4,4'-disulfonyl chloride; diphenylether-4,4'-disulfonylchloride bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychrolomethylsytrene) of the polymers and copolymers can also be used as initiators.

Once the polymerization is complete, the method may include further reacting the resultant polymer to form at least one functional end group onto the polymer. The functionality of the intermediate product creates a multi-use end product that may be converted into one or more final products. The final products may then be implemented into various commercial products or procedures, as may be desired. In order to quench the reaction and terminate the process, strong nucleophiles may be added to the reaction mixture. Such nucleophiles include, for example: thiolate, amine, azide, carboxylate, alkoxide, phenoxide, and sodium acrylate. One or a combination of nucleophiles may be used as may be desired in order to terminate the reaction while maintaining chain stability and integrity. Creating functional ends on the polymer may be done, for example, by performing either an end-capping reaction or a substitution reaction.

To functionalize the final product polymer by an end-capping reaction, the required steps may be done in situ in the reaction vessel at the end of the initial reaction, prior to work-up. To perform an end-capping functionalization of at least one polymer end, the steps include: providing a final polymer product; adding a capping agent to the vessel; quenching the reaction; and purifying a capped polymer product.

The capping agent may include one or a combination of compounds, as may be desired to cap the end group of the final product with a desired functional end group while maintaining chain stability and integrity. For example the capping agent may include: 2 allyl alkyl ethanol, allyl alcohol, allyl glycidyl ether, 1-6 heptadiene, cyclooctyl diene, norbornadiene, and other olefins with a known tendency to not form homopolymers under SET-LRP conditions.

The final products of the methods of the present invention include, for example, homopolymers and/or (co)polymers, which may be block, random, statistical periodic, gradient star, graft, comb, (hyper)branched or dendritic polymers. The "(co)" parenthetical prefix in conventional terminology is an alternative, viz., "(co)polymer means a copolymer or polymer, including homopolymer. Similarly "(hyper)" as used herein, refers to a comparatively high degree of dendritic-like branching along the co-polymer backbone as compared to a low degree of branching.

The present invention may be used to prepare periodic or alternating copolymers. The methods of the present invention may be particularly useful for producing alternating copolymers where one of the monomers has one or two bulky substituents, from which homopolymers may be difficult to prepare, due to steric considerations. Copolymerization of monomers with donor and acceptor properties results in the formation of products with predominantly alternating monomer structure.

So-called "alternating" copolymers can be produced using the methods of the present invention. "Alternating" copolymers are prepared by copolymerization of one or more monomers having electron-donor properties with one or more monomers having electron acceptor type properties (acrylates, methacrylates, unsaturated nitriles, unsaturated ketones, etc.). The present random or alternating copolymer can also serve as a block in any of the present block, star, graft, comb or hyperbranched copolymers.

The end product may be characterized by one or more features, including: molecular weight, polydispersion, monomodal distribution of molecular weights, etc. One or more of the methods of the present invention may yield a polymer product having a molecular weight of 2,000 to 20,000,000 g/mol. Also, the polymer product has a monomodal distribution of polymer molecular weights. Further, the polymer product may also have a polydispersity from about 1.01 to about 2. In certain embodiments, the polymer produced by the process described herein has a number average molecular weight of at least about 500. In yet other embodiments the polymer has a number average molecular weight of at least 1,000,000.

Various additives may be added alone or as blends to polymerizable compositions including the various additional monomers, initiators, catalysts, diluents, stabilizers, fillers, plasticizers and other components described herein. The various combinations of the herein described components are intended to be included within the various embodiments of the invention.

One or more additive components may optionally be added to the compositions of the present invention and include, but are not limited to, curing agents, antioxidants (e.g., Ciba® Irganox® 1010 (commercially available from CIBA Specialty Chemicals, Inc., Basel, Switzerland), pigments, accelerators and stabilizers. Such additives are known to the person skilled in the art and should be present in an amount suitable to effectuate their intended purpose.

As used herein, "polydispersity" (also known as "polydispersity index" and "molecular weight distribution") refers to the ratio of weight average molecular weight/number average molecular weight for a subject polymer. This value provides an indication of the broadness of the molecular weight distribution of the subject polymer. Thus, for a monodisperse polymer where the weight average molecular weight equals the number average molecular weight, the value will be 1. As the breadth of molecular weight distribution increases, the polydispersity will be greater than 1.

The (meth)acrylic-containing telechelic polymers of the blends of the present invention have a polydispersity of about 1.01 to about 2.50 and more desirable 1.01 to about 1.50.

In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition a ratio of 10:1 to 1:10, such as, from 5:1 to 1:5, from 5:1 to 2:1. In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition a ratio of 5:1. In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition at a ratio of 3:1. In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition a ratio of 1:1. In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition at a ratio of 1:2. In an embodiment, the blend includes two (meth)acrylic-containing telechelic polymers, including a first (meth)acrylic-containing telechelic polymer and a second (meth)acrylic-containing telechelic polymer, in which the first and second (meth)acrylic-containing telechelic polymers are in the composition at a ratio of 1:4. In an embodiment, the blend includes two (meth)acrylic-containing telechelic polymers, including a first (meth)acrylic-containing telechelic polymer and a second (meth)acrylic-containing telechelic polymer.

In an embodiment, the blend includes a first (meth)acrylic-containing telechelic polymer of a 30,000 molecular weight terpolymer of 75% butyl acrylate/20% ethyl acrylate/5% methoxyethyl acrylate, end-capped with methacrylate and a second (meth)acrylic-containing telechelic polymer of a 10,000 molecular weight terpolymer of 75% butyl acrylate/20% ethyl acrylate/5% methoxyethyl acrylate, end-capped with methacrylate, wherein the weight ratio of the first polymer to the second polymer in the blend is 0:1 to 1:10, such as, from 5:1 to 1:5, or for example from 5:1 to 2:1. In an another embodiment, the blend includes a first (meth)acrylic-containing telechelic polymer of a 30,000 molecular weight terpolymer of 75% butyl acrylate/20% ethyl acrylate/5% methoxyethyl acrylate, end-capped with methacrylate and a second (meth)acrylic-containing telechelic polymer of a 10,000 molecular weight terpolymer of 75% butyl acrylate/20% ethyl acrylate/5% methoxyethyl acrylate, end-capped with methacrylate, wherein the weight ratio of the first polymer to the second polymer in the blend is selected from the ratios of 5:1, 3:1, 1:1, 1:2. or 1:4.

The (meth)acrylic-containing telechelic polymers may be present in varying amounts, depending on the combination of components desired. For example, in some embodiments, the blend of (meth)acrylic-containing telechelic polymers may be present in amounts of about 50% to about 65% by weight of the composition. In other embodiments of the present invention, the blend of (meth)acrylic-containing telechelic polymers may be present in amounts of about 50% to about 95% by weight of the composition. In an embodiment, the composition has a first (meth)acrylic-containing telechelic polymer an amount of 10% by weight to about 90% weight of the total composition and a second (meth)acrylic-containing telechelic polymer in an amount 90% by weight to about 10% by weight of the total composition.

As shown in the examples, the use of a blend of at least two (meth)acrylic-containing components blends can provide improved properties including tensile strength, elongation and compression set. The compositions described in this application are particularly useful in gasketing applications, where these improved properties have distinct advantages commercially.

The compositions may be used as sealants and adhesives for substrates such as cork, cardboard, fabric, graphite, metal, paper, metal, elastomer or a combination of two or more thereof. In one embodiment, the substrate is a gasket including graphite. The compositions of the present invention may be employed as a form-in-place gasket. Alternatively, the compositions of the present invention may be applied as a coating to a prefabricated gasket. The compositions of the present invention may also be employed as a structural adhesive.

The invention may be further understood with reference to the following non-limiting examples.

EXAMPLES

Materials and Methods

Several liquid polyacrylate polymers were prepared by Single Electron Transfer Living Radical Polymerization (SET-LRP) and then end-capped with methacrylate functional groups. Polymers were made with varying molecular weights (10,000 vs. 30,000) and blended in different ratios as shown in the table.

TABLE 1

|  | Comp. 1 control | Comp. 2 inventive | Comp. 3 inventive | Comp. 4 inventive | Comp. 5 inventive | Comp. 6 inventive | Comp. 7 control |
| --- | --- | --- | --- | --- | --- | --- | --- |
| Weight % Polymer 1 in blend | 100 | 83.3 | 75 | 50 | 33.3 | 20 | 0 |
| Weight % Polymer 2 in blend | 0 | 16.7 | 25 | 50 | 66.7 | 80 | 100 |
| Ratio | 1:1 | 5:1 | 3:1 | 1:1 | 1:2 | 1:4 | 0:1 |
| AMWB | 30000 | 26660 | 25000 | 20000 | 16660 | 14000 | 10000 |

Resin 1 was prepared by including the following: a 75% butyl acrylate/20% ethyl acrylate/5% methoxyethyl acrylate terpolymer, end-capped with methacrylate (difunctional), with molecular weight 30,000 and MWD<1.3.

Resin 2 had the identical backbone composition of Resin 1, however, with a molecular weight of 10,000.

Blends of Resin 1 and Resin 2 were prepared at weight ratios of 5:1, 3:1, 1:1, 1:2, and 1:4. The blends were compared to the use of Resin 1 alone as well as Resin 2 alone.

These blends were incorporated into a model UV-curable gasket formulation. The model formulation contained 73 wt % of the resin blend, 20 wt % of reactive diluent, 1 wt % photoinitiator, 1 wt % antioxidant, and 5 wt % inorganic filler. The resulting formulations were UV-cured and tested for compression set at 70° C. and 150° C. and tensile properties at room temperature, and they were also evaluated by dynamic mechanical analysis (DMA), as described below.

Example 1

This Example uses inventive Composition 3 from Table 1.

1.002 g of antioxidant Irganox® 3052 was dissolved in 20.016 g N,N dimethylacrylamide. The solution was added to a blend of 54.749 g Resin 1 and 18.253 g Resin 2. To this mixture were added 5.017 g Aerosil® 380 (silica filler) and 1.066 g Darocure® 1173 (photoinitiator). The entire composition was mixed in a DAC 400 FVZ speed mixer for 3 minutes at 2500 rpm. Standard 5×5 X. 0.075 inch test sheets were prepared and cured by irradiating for 30 s per side (60 s total) in a Zeta 7216 UV chamber at an effective irradiance of 100 mW/cm². From the test sheets, dogbone tensile specimens and compression set discs were pressed, and thin rectangular specimens for dynamic mechanical analysis (DMA) were cut. The tensile dogbones were pulled in an Instron at a crosshead speed of 20 in./min. The tensile strength at break was 623 psi, and elongation was 223%. The compression set discs were stacked to give an initial thickness of 0.508"; they were then compressed by 25% and placed in a 70° C. oven for 70 hours. After removal from the oven and compression, the final thickness was 0.463", corresponding to a compression set of 35%. DMA was used to measure $T_g$, defined as the peak in tan delta. For the composition described above, $T_g=-24°$ C.

Example 2

This Example uses inventive Composition 2 from Table 1.

1.00 g Irganox® 3052 was dissolved in 20.005 g N,Ndimethylacrylamide. The solution was added to a blend of 60.836 g Resin 1+12.162 g Resin 2. To the mixture were added 5.010 g Aerosil® 380 and 1.001 g Darocure® 1173. The composition was mixed and test sheets were prepared as described in Example 1. For this composition, compression set after 70 hr at 70° C. was 37%; tensile strength and elongation at break were 711 psi and 230%, respectively. Glass transition temperature measured by DMA was −24° C.

Example 3

This Example uses inventive Composition 1 from Table 1.

Comparative Resin 2 alone (high, 30,000 MW Polymer) 0.502 g Irganox 3052 was dissolved in 10.000 g N,N-dimethylacrylamide and added to 36.503 g Resin 1. To this mixture were added 2.501 g Aerosil® 380 and 0.499 g Darocure® 1173. The composition was mixed and test sheets were prepared as described in Example 1.

Example 4

This Example uses inventive Composition 7 from Table 1.

Comparative Resin 1 alone (low, 10,000 MW Polymer) 1.005 g Irganox® 3052 was dissolved in 20.002 g N,N-dimethylacrylamide and added to 73.006 g Resin 3. To this mixture were added 5.000 g Aerosil® 380 and 1.015 g Darocure® 1173. The composition was mixed and test sheets were prepared as described in Example 1.

The results of Examples 1-4 are shown below:

TABLE 2

| Example | Compression Set (%) | Tensile Strength (psi) | Elongation at Break (%) | $T_g$ (° C.) |
|---|---|---|---|---|
| 1 | 35 | 623 ± 17 | 220 ± 26 | −24 |
| 2 | 37 | 711 ± 99 | 230 ± 11 | −24 |
| 3 | 38 | 433 ± 43 | 190 ± 13 | −25 |
| 4 | 13 | 411 ± 46 | 120 ± 24 | −16 |

The results indicate that the low molecular weight resin (unblended) had excellent compression set but poor tensile properties and high Tg. The high molecular weight resin (unblended) had better Tg but higher compression set and marginal tensile properties. However, blending the two polymers, particularly at the 3:1 Resin 1: Resin 2 ratio, gave acceptable compression set but also gave higher tensile strength and higher elongation than either resin alone could provide. As reflected in Table 2, the exemplary composition blends of two different molecular weight polymers provide significantly improved compression properties as compared to the use of single molecular weight polymer alone (low molecular weight or high molecular weight). Based on these results, the blends can be used to provide improved compressive gaskets for use in, e.g. automobiles, as well as for use in other industrial machines.

The results of the study conducted with this exemplary composition are summarized in Table 3.

Figure 3:
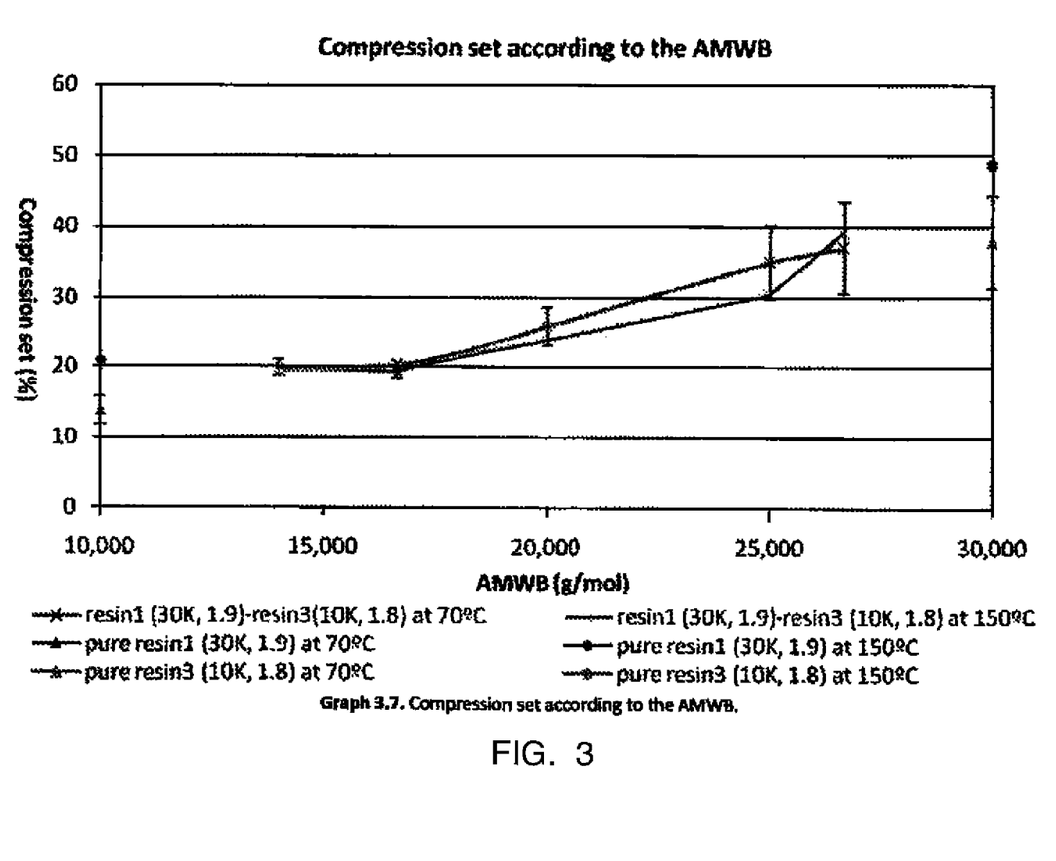
FIG. 3 shows a graph of compressive set according to AMWB.
Figure 4:
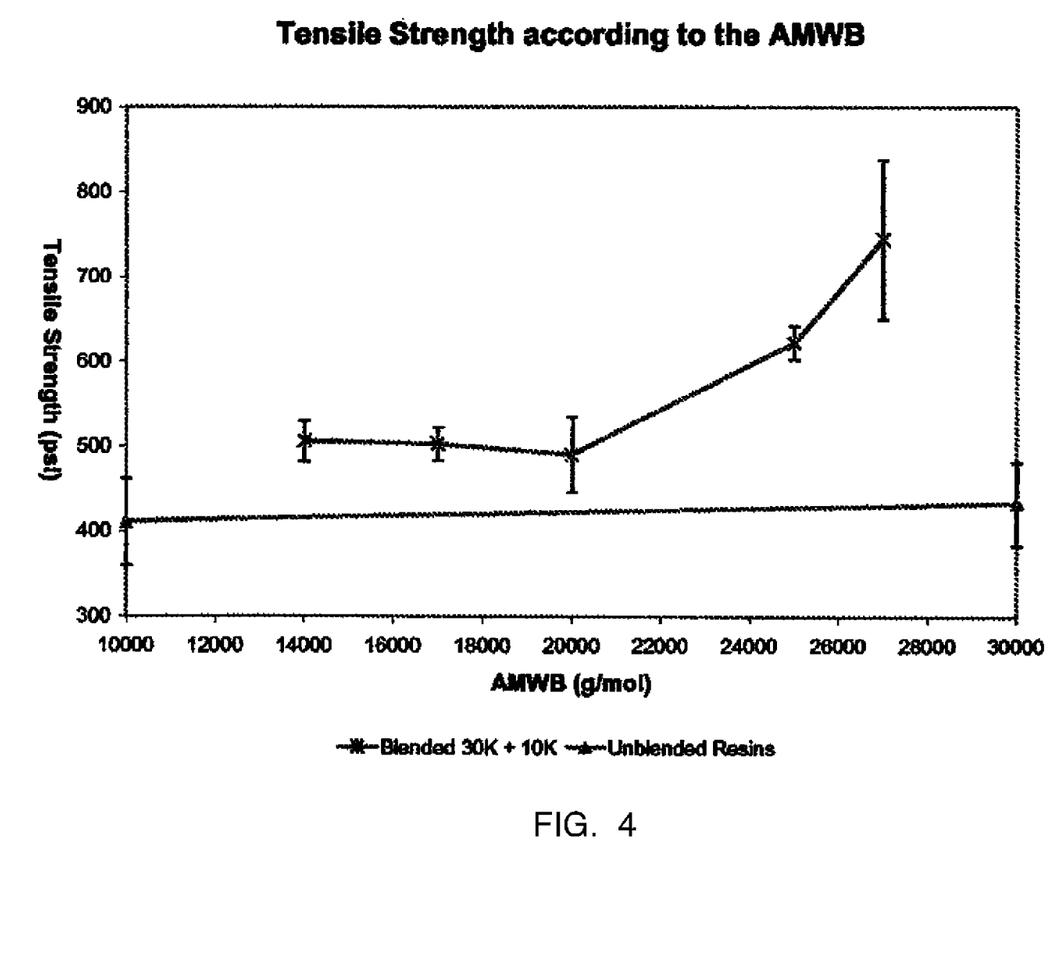
FIG. 4 shows a graph of tensile strength according to AMWB.
Figure 5:
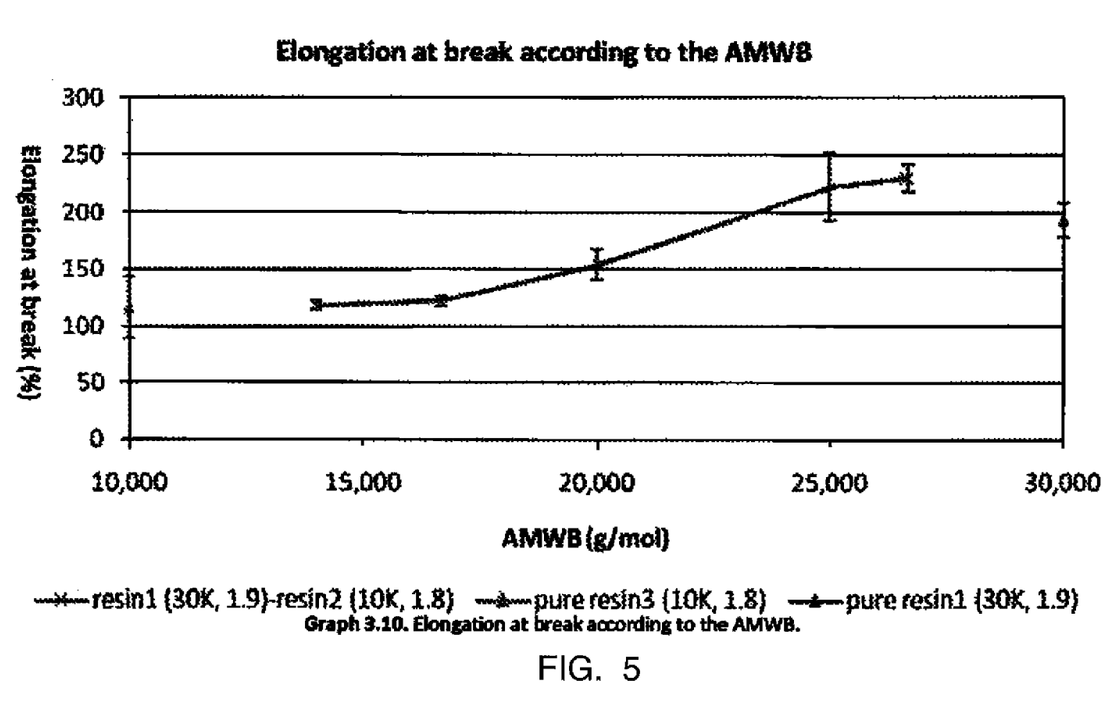
FIG. 5 shows a graph of elongation break according to AMWB.
Figure 6:
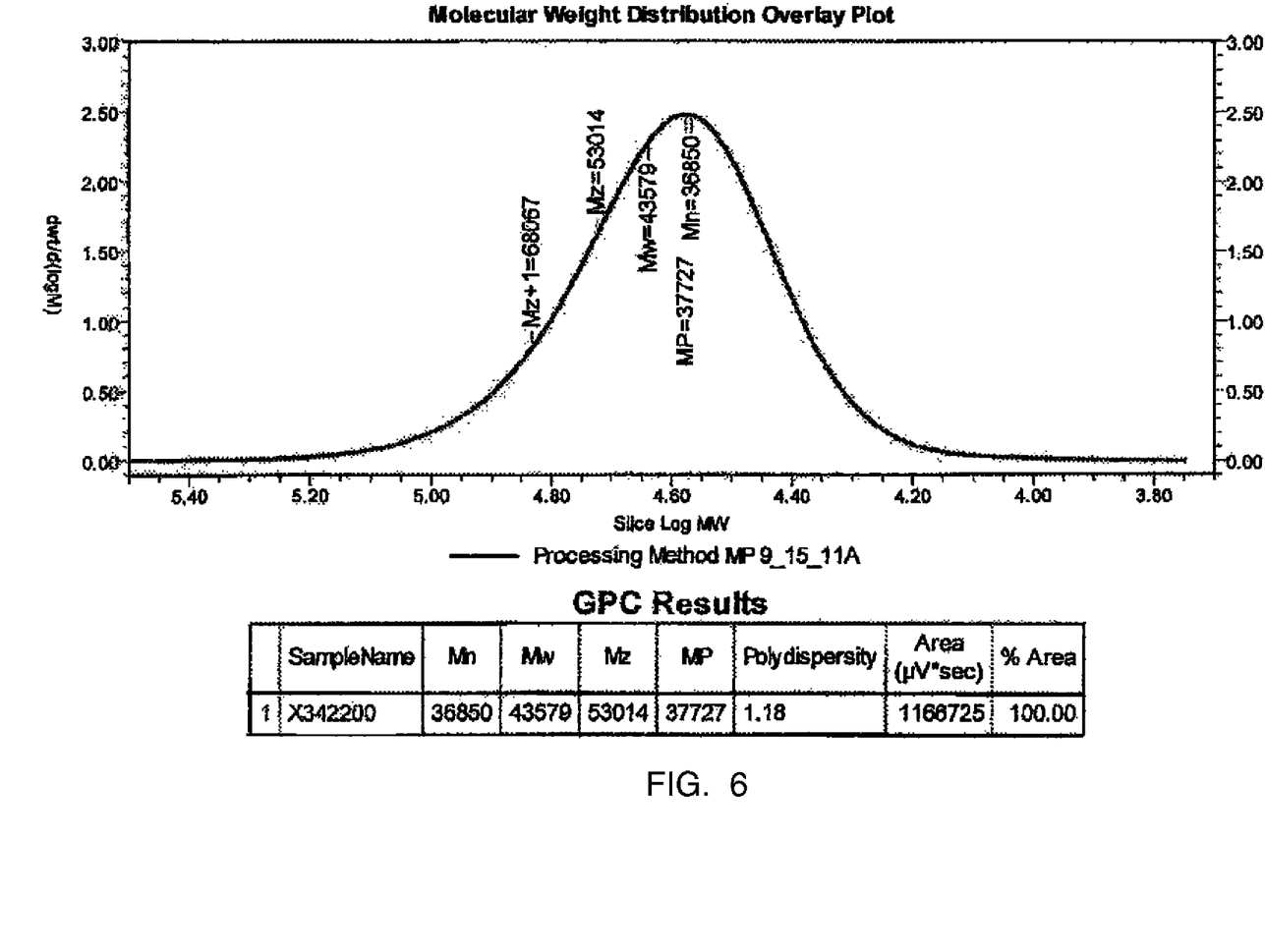
FIG. 6 shows a GPC analysis of Resin 1, as described herein.
Figure 7:
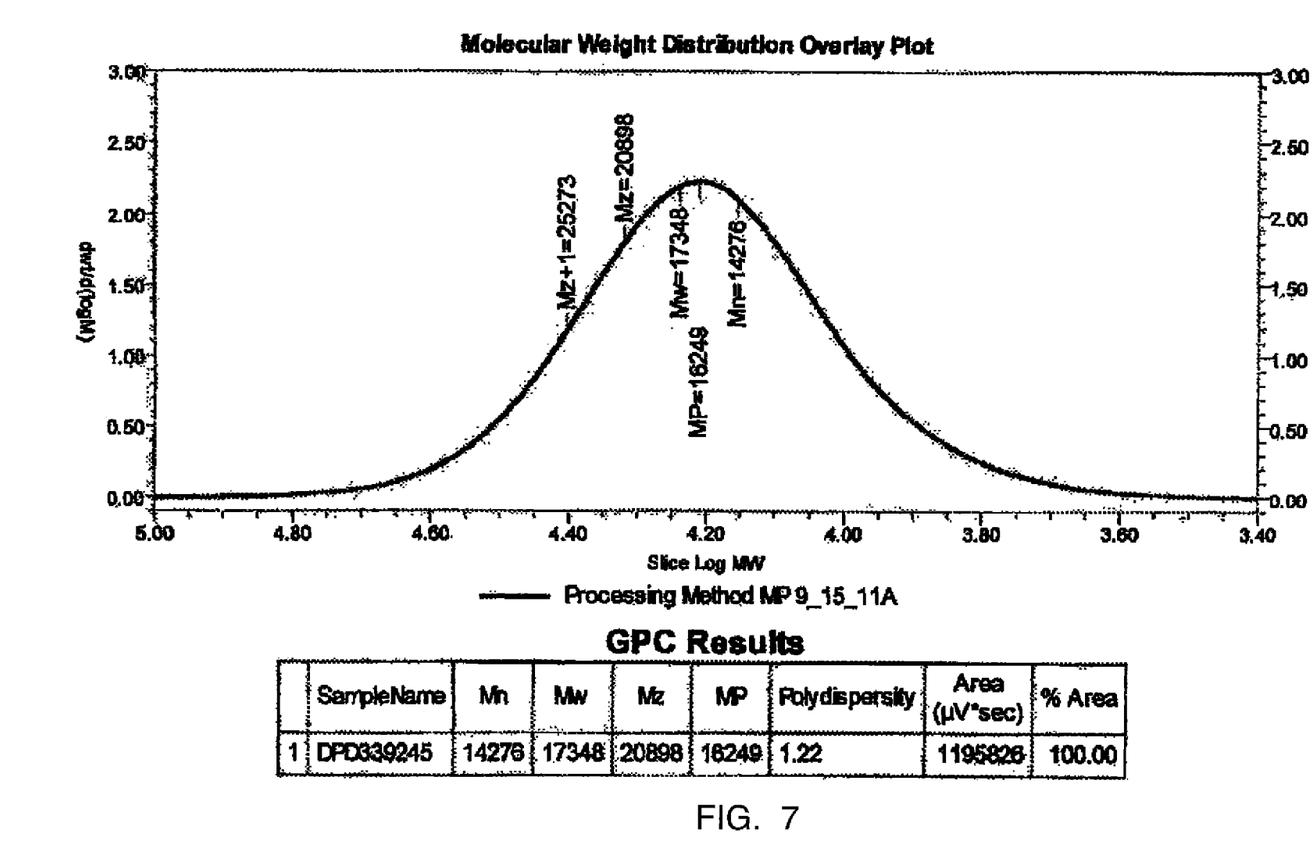
FIG. 7 shows a GPC analysis of Resin 2, as described herein.
Figure 8:
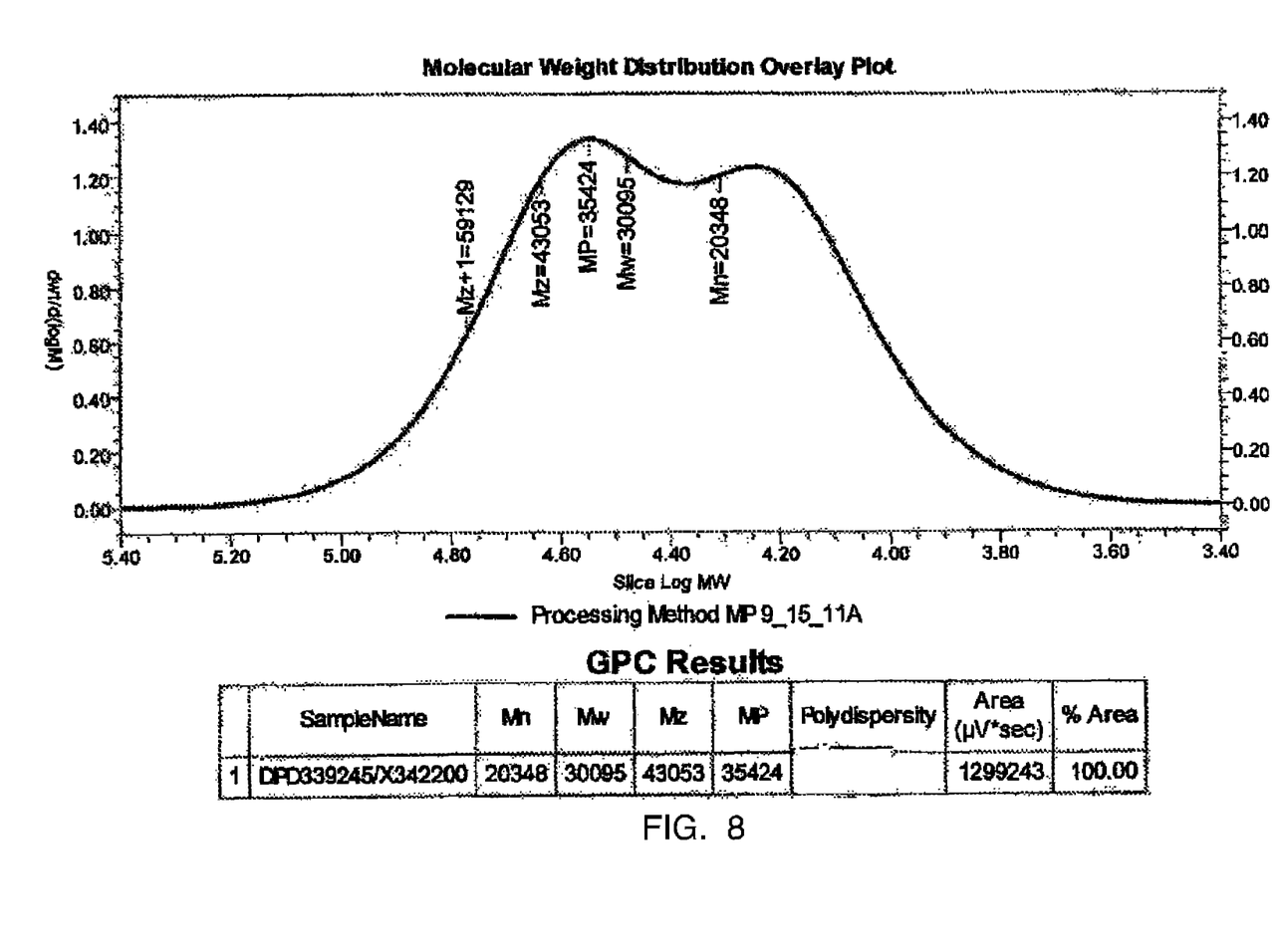
FIG. 8 shows a GPC analysis of a 50:50 by weight blend of Resin 1 and Resin 2, as described herein.

FIGS. 3-5 plot the data for compression, tensile and elongation respectively.

TABLE 3

| Ratio (Polymer1:Polymer2) | AMWB | Compression Set (%) | Tensile Strength (psi) | Elongation at Break (%) | Tg (° C.) |
|---|---|---|---|---|---|
| 1:0 | 30,000 | 38 | 433 ± 43 | 193 ± 13 | −25 |
| 5:1 | 26,660 | 37 | 711 ± 99 | 230 ± 11 | −24 |
| 3:1 | 25,000 | 35 | 623 ± 17 | 223 ± 26 | −24 |
| 1:1 | 20,000 | 25 | 490 ± 39 | 154 ± 12 | −21 |
| 1:2 | 16,660 | 20 | 503 ± 17 | 122 ± 4 | −21 |
| 1:4 | 14,000 | 20 | 505 ± 21 | 118 ± 4 | −19 |
| 0:1 | 10,000 | 13 | 411 ± 46 | 116 ± 24 | −16 |

What is claimed is:

1. A composition comprising a blend of at least two (meth) acrylic-containing components said blend comprising:
   a) a first (meth)acrylic-containing telechelic polymer component having a molecular weight less than 15,000; and
   b) a second (meth)acrylic-containing telechelic polymer component having a molecular weight greater than 15,000; wherein said blend has an average molecular weight from about 14,000 to about 40,000 and wherein each polymer of said blend has a polydispersity from about 1.01 to about 2.55.

2. The composition of claim 1 wherein the ratio of said first to said second (meth)acrylic-containing telechelic polymer component is from 10:1 to 1:10.

3. The composition of claim 1 wherein the ratio of said first to said second (meth)acrylic-containing telechelic polymer component is from 5:1 to 1:5.

4. The composition of claim 1 wherein polydispersity of each polymer of said blend is greater than 1.01 to about 1.50.

5. The composition of claim 1, wherein the first (meth) acrylic-containing telechelic polymer component has a backbone selected from butyl acrylate-co-ethyl acrylate, butyl acrylate-co-ethyl acrylate-co-methoxyethyl acrylate and combinations therein.

6. The composition of claim 1, wherein the second (meth) acrylic-containing telechelic polymer component has a backbone selected from butyl acrylate-co-ethyl acrylate, butyl acrylate-co-ethyl acrylate-comethoxyethyl acrylate and combinations therein.

7. The composition of claim 1, wherein the first or second (meth)acrylic-containing telechelic polymer component has a backbone selected from monofunctional (meth)acrylate monomers, homopolymers of monofunctional $C_{1-10}$ alkyl (meth)acrylates and copolymers of monofunctional $C_{1-10}$ alkyl(meth)acrylates and combinations thereof.

8. The composition of claim 1, wherein the first or second (meth)acrylic-containing telechelic polymer component has a backbone selected from ethyl acrylate, methoxyethyl acrylate, n-butyl acrylate and homopolymers and copolymers thereof.

9. The composition of claim 1, wherein the first or second (meth)acrylic-containing telechelic polymer component has a backbone selected from a segments of polyurethane, styrene, and/or acrylonitrile and combinations thereof.

10. The composition of claim 1, wherein first and second meth)acrylic-containing telechelic polymer has a backbone which includes a segment selected from the group consisting of a polyurethane, styrene, acrylamides, and combinations thereof.

11. The composition of claim 1, wherein said first and/or second (meth)acrylic-containing telechelic polymer components are a polymer selected from the group consisting of a random or block copolymer.

12. The composition of claim 1, wherein the first (meth) acrylic-containing telechelic polymer component has the same polymer backbone composition as the second (meth) acrylic-containing telechelic polymer component.

13. The composition of claim 1, wherein the first (meth) acrylic-containing telechelic polymer component has a different polymeric backbone composition as the second (meth) acrylic-containing telechelic polymer component.

14. The composition of claim 1, wherein said first and/or second (meth)acrylic-containing telechelic polymer components are a polymer prepared from monomers selected from the group consisting of hydroxypropyl (meth)acrylate, (meth)acrylic acid, and tetrahydrofuran (meth)acrylates, tetrahydrodicyclopentadienyl (meth) acrylate, dimethyl acrylamide, butyl acrylate, ethyl acrylate, methoxyethyl acrylate, (meth)acrylamides and substituted (meth)acrylamides, and combinations thereof.

15. The composition of claim 1, wherein said composition when cured exhibits the following properties:
compression set percent of about less than about 35% at temperatures of 150 degrees C.; and elongation at break at room temperature of about 100% to 300% and tensile strength at room temperature of about 500 psi to 1800 psi.

16. A method of preparing a composition comprising the steps of:
providing a first (meth)acrylic-containing telechelic polymer component having a first molecular weight; and a second (meth)acrylic-containing telechelic polymer component having a molecular weight that is different from said first molecular weight; wherein said blend has an average molecular weight from about 14,000 to about 40,000; wherein each polymer of said blend has a polydispersity from about 1.01 to about 2.55,and
mixing the said first and said second (meth)acrylic-containing telechelic polymer components.

17. A composition comprising the reaction product of: a blend of at least two (meth)acrylic-containing components said blend comprising:
a) a first (meth)acrylic-containing telechelic polymer component having a molecular weight less than 15,000; and
b) a second (meth)acrylic-containing telechelic polymer component having a molecular weight greater than 15,000; wherein said blend has an average molecular weight from about 14,000 to about 40,000, and wherein each polymer of said blend has a polydispersity from about 1.01 to about 2.55.

18. A process for applying a seal to an article comprising the steps of
a) forming blend comprising:
i) a first (meth)acrylic-containing telechelic polymer component having a first molecular weight;
ii) a second (meth)acrylic-containing telechelic polymer component having a second molecular weight that is different from said first molecular weight; wherein said blend has an average molecular weight from about 14,000 to about 40,000; wherein each polymer of said blend has a polydispersity from about 1.01 to about 2.55, and
b) optionally at least co-reactive component;
c) depositing said blend on said article in the shape and thickness desired to form an uncured seal; and
d) curing said uncured seal with a cure system appropriate to and for a time sufficient to form a cured seal.

19. A process for applying a seal to an article comprising the steps of
a) forming blend comprising:
i) a first (meth)acrylic-containing telechelic polymer component having a first molecular weight;
ii) a second (meth)acrylic-containing telechelic polymer component having a second molecular weight that is different from said first molecular weight; wherein said blend has an average molecular weight from about 14,000 to about 40,000 and a polydispersity of greater than 1.8; and
ii) optionally at least one co-reactive component;
b) depositing said mixture on said article in the shape and thickness desired to form an uncured seal; and
c) joining said uncured seal to another article and curing said uncured seal with a curing system appropriate to and for a sufficient time to form a seal.

20. The composition of claim 1, wherein (1) the first (meth) acrylic-containing telechelic polymer component comprises a 30,000 average molecular weight terpolymer constructed of 75% butyl acrylate/20% ethyl acrylate/5% methoxyethyl acrylate, end-capped with methacrylate and (2) the second (meth)acrylic-containing telechelic polymer component comprises a 10,000 average molecular weight terpolymer constructed of 75% butyl acrylate/20% ethyl acrylate/5% methoxyethyl acrylate, end-capped with methacrylate.

* * * * *